United States Patent [19]

Kirksey

[11] Patent Number: 4,985,228
[45] Date of Patent: Jan. 15, 1991

[54] PURIFICATION OF HYDROGEN PEROXIDE

[75] Inventor: Kirby Kirksey, Newark, Del.

[73] Assignee: E. I. Du Pont de Nemours and Company, Wilmington, Del.

[21] Appl. No.: 553,291

[22] Filed: Jul. 17, 1990

[51] Int. Cl.$^5$ .............................................. C01B 15/01
[52] U.S. Cl. ................................................... 423/584
[58] Field of Search ........................................ 423/584

[56] References Cited

U.S. PATENT DOCUMENTS

| | | | |
|---|---|---|---|
| 3,012,860 | 12/1961 | Meeker et al. | 423/584 |
| 3,294,488 | 12/1966 | Dunlop et al. | 423/584 |
| 3,305,314 | 2/1967 | Freeland et al. | 423/584 |
| 3,387,938 | 6/1968 | Leauer | 423/584 |
| 3,664,812 | 5/1972 | Hoyt | 423/584 |
| 4,389,390 | 6/1983 | Dalton et al. | 423/584 |

FOREIGN PATENT DOCUMENTS

| | | | |
|---|---|---|---|
| 665476 | 6/1963 | Canada | 423/584 |
| 811713 | 4/1969 | Canada | 423/584 |
| 14906 | 8/1963 | Japan | 423/584 |

Primary Examiner—Wayne A. Langel
Attorney, Agent, or Firm—Charles E. Krukiel

[57] ABSTRACT

A method is disclosed for the purification of hydrogen peroxide by using activated carbon which has been chemically modified by using ammonium carbonate, $(NH_4)_2CO_3$, or by using ethylenediaminetetraacetic acid diammonium salt, $(NH_4)_2EDTA$, followed by distillation.

12 Claims, No Drawings

PURIFICATION OF HYDROGEN PEROXIDE

FIELD AND HISTORICAL BACKGROUND OF THE INVENTION

This invention relates to a method for the purification of hydrogen peroxide and, more particularly, to a method which is capable of producing hydrogen peroxide of the highest quality, that is suitable for use in the electronics industry as a cleaning agent.

Perhaps the most single problem being experienced in the electronics industry at the present time is the effect of contamination during the manufacture of microcircuit devices, such as chips and wafers. As these devices become more complex, and smaller in dimension, sensitivity to the presence of contaminants becomes more of a problem and to the extent wherein acceptable quality of product cannot be achieved, such contaminants, in the form of solid particles, can open or short circuit, affect photolithographic reproduction, alter electrical properties and even damage the crystal structure of these electronic devices.

One of the obvious steps which has been pursued in order to eliminate, or at least to reduce the effects of contamination to an acceptable limit, is in the improvements relating to the cleansing of electronic devices themselves and to the cleansing media used in such cleaning steps. In some instances, very elaborate steps must be taken to clean or purify one or more of the ingredient agents utilized in the cleaning medium used in removing contaminants from an electronic device, say, for example, in a wafer cleaning process.

The presence of contaminant ions in chemicals supplied to the electronics industry is currently a major concern as users insist on ultrapure reagents for their processes. The Semi-Conductor Equipment and Materials Institute has established standards which greatly reduced the parts-per-billion level, and further reductions are always in prospect.

Despite even the most well documented cleaning processes, contamination still occurs. As known in the art, wafer cleaning processes include liquid and gas-phase chemical techniques as well as physical means such as scrubbing, pressurized fluid jets, ultrasonics and megasonics. Of the many cleaning methods which have been tested and evaluated, the most effective procedures have utilized hydrogen peroxide as a cleaning agent. While hydrogen peroxide is presently considered as the most effective cleaning agent for cleaning wafers and the like, present day production of this agent has not been able to provide the electronics industry with such agents with sufficient purity that will enable the industry, in turn, to produce high quality products.

Hydrogen peroxide use in the electronics industry is expected to grow by 10-20% annually. The current products are expected to be unacceptable for the needs of the semi-conductor manufacturers in the years ahead. Conventional methods for purifying hydrogen peroxide has included the treatment of the reagent with various grades of carbon combined with washing steps of different temperatures and times. However, these pretreatments of reagents, in themselves, were the cause of the increase of contaminants in the final peroxide product.

In the East German Patent DD 216,701, dated Dec. 19, 1984, a specific method is disclosed for purifying hydrofluoric acid using activated carbon treated with ammonium carbonate.

OBJECTS AND BRIEF SUMMARY OF THE INVENTION

Therefore, it is the principal object of the present invention to produce hydrogen peroxide of the highest quality being suitable for use as a cleaning agent for the state of the art electronic components.

Another object of the present invention is to produce activated carbon that is effective in total carbon removal and cation reduction, and which is compatible with hydrogen peroxide Yet another object of the present invention is to select carbon pretreatment reagents which do not significantly increase the contaminants in the final peroxide product.

An additional object of the present invention is to produce activated/treated carbon whose performance exceeds that of the untreated carbon.

The present invention was devised to overcome the deficiencies existing in the present day methods of preparing hydrogen peroxide for the cleaning of electronic components by utilizing activated carbon which has been pretreated in a novel way to maximize the amount of impurities which can be removed and to minimize the reverse flow of impurities. In practicing the invention, activated carbon is slurred into deionized water to make a 10% slurry. The appropriate ammonium ion from either ammonium carbonate, $(NH_4)_2CO_3$, or ethylenediaminetetraacetic acid diammonium salt, $(NH_4)_2EDTA$, is added to make about 0.5, 1.0 or 3.0 wt % treatment with respect to the carbon. The carbon is allowed to stir at ambient temperature for 30 minutes. This material is then filtered and dried at 115° C. for about ten hours. The treated activated carbon is then placed in contact with the hydrogen peroxide to be purified. The mixture is stirred for a few minutes, filtered, and the filtrate removed for use as purified hydrogen peroxide. If additional purity is desired, the removed hydrogen peroxide is distilled prior to use.

Hydrogen peroxide can be produced by various processes, but in keeping with the desired goal of producing extremely high quality material, the anthraquinone process is preferred. The steps in this process to produce high grade peroxide include: hydrogenating oxidation, extraction, solvent scrubbing, settling, cation resin treatment, carbon treatment, cation resin treatment, distillation, absorption and dilution. The product after the initial cation resin treatment is a very pure product except for the presence of various organic species which contribute to one of key parameters for electronics grade peroxide, namely, total carbon. The present invention contemplates the addition and use of activated carbon to remove these compounds.

In order to use carbon in the process of producing hydrogen peroxide, carbon must be effective in total carbon removal and final product purity, as well as being acceptable with regard to temperature rise and the peroxide decomposition rate. It has been found that, with regard to final product purity carbon was contributing significant metallic ions to the peroxide after it contacted with the peroxide.

DETAILED DESCRIPTION OF THE INVENTION

In accomplishing the present invention, it is a necessary step that a pretreatment step be devised to insure that the activated carbon is of sufficient quality and has the capability of removing the contaminating particles present in the peroxide being cleaned, and that the carbon itself, or the cleaning agents used in the pretreatment step, do not themselves contribute to contaminating particles.

Therefore, the pretreatment method must produce an activated carbon that is effective in total carbon removal and cation reduction. The carbon after pretreatment must be compatible with hydrogen peroxide, and the pretreatment reagents must be such as would not significantly increase the contaminants in the final peroxide product.

In the pretreatment step for conditioning activated carbon, the carbon is hot washed using ammonium carbonate as an additive at 0.5 wt % in a first wash. While only one wash is necessary, it will be understood that if additional hot washes are performed, each hot wash being conducted for approximately 20 minutes, improved purity may be achieved. Impurities such as nitrates, chlorine, phosphate and sulphate were reduced significantly during each of the washes. Just as important in the removal of impurities is that only insignificant amounts of impurities may be added during the washes.

In pretreating activated carbon, it is known that the removal efficiency for nitrates is relatively low. However, the ability for ammonium carbonate to remove nitrates that are chemically bonded to activated carbon has been found to be superior to other known materials. Nevertheless, because all activated carbons that are compatible with peroxide are organic in nature, they contribute to some extent impurities such as calcium and magnesium. These trace materials, however, can be removed in resin treatment.

It has also been found in accordance with the invention that ammonium carbonate pretreatment of activated carbon reduced the levels of magnesium, manganese, potassium, silicon, sodium, titanium and zinc in the treated hydrogen peroxide. In addition, phosphate levels can be reduced by two-thirds as compared to untreated activated carbon.

In preparing pretreated activated carbon for use in cleaning hydrogen peroxide, carbon is slurred in deionized water to make a 10% slurry. The ammonium carbonate $(NH_4)_2CO_3$, is added to make about 0.5, 1 or 3 wt % treatment with respect to the carbon. The carbon is allowed to stir at ambient temperature for about 30 minutes, then filtered and dried at about 115° C. for about 5–10 hours. The carbon is then contacted with hydrogen peroxide as a 1% slurry for five minutes. The slurry is filtered by using a 0.2 mu filter, and the finished product withdrawn for use as the cleaning reagent.

The final step in the purification of hydrogen peroxide, that of distilling the resulting product after contacting with the pretreated activated carbon, is designed to enhance the purity of the product.

In another embodiment, ethylenediaminetetraacetic acid diammonium salt, $(NH_4)_2EDTA$, replaces the ammonium carbonate in the pretreatment step for activated carbon. This salt has the ability to reduce larger amounts of magnesium in the contacting step and results in a lower peroxide decomposition rate than that caused by the use of ammonium carbonate.

Typical samples of the reagent grade 30% hydrogen peroxide spiked with appropriate ions after being treated and filtered are shown in Table 1 with the treating agent ammonium carbonate, $(NH_4)_2CO_3$, being between 0.5–3.0 wt %, and in Table 2 with the treating agent ethylenediaminetetraacetic acid diammonium salt, $(NH_4)_2EDTA$. In both of these tables the ions are measured in mg/ml.

TABLE 1

| Samples | Fe | Pd | Cu | Al | Sn | Na | Si |
|---|---|---|---|---|---|---|---|
| 1 | <0.003 | <0.005 | <0.004 | 0.111 | <0.02 | 1.23 | 0.9 |
| 2 | <0.003 | <0.005 | <0.004 | 0.097 | <0.02 | 1.32 | 0.9 |
| 3 | 0.0087 | <0.005 | <0.004 | 0.070 | <0.02 | 1.38 | 0.9 |
| 4 | <0.003 | <0.005 | 0.004 | 0.007 | <0.02 | 1.19 | 0.9 |
| 5 | <0.003 | <0.005 | <0.004 | 0.125 | <0.02 | 1.62 | 1.1 |
| 6 | 0.0058 | <0.005 | <0.004 | 0.008 | <0.02 | 1.43 | 0.9 |

TABLE 2

| Samples | Fe | Pd | Cu | Al | Sn | Na | Si |
|---|---|---|---|---|---|---|---|
| 1 | <0.003 | <0.006 | 0.004 | 0.020 | <0.02 | 1.16 | 1.0 |
| 2 | 0.020 | 0.006 | 0.008 | 0.240 | <0.02 | 1.25 | 1.0 |
| 3 | <0.003 | 0.006 | 0.004 | 0.045 | <0.02 | 1.28 | 1.1 |
| 4 | <0.003 | 0.006 | 0.004 | 0.315 | <0.02 | 1.28 | 1.0 |
| 5 | <0.003 | 0.006 | <0.004 | 0.158 | <0.02 | 1.38 | 1.3 |
| 6 | 0.044 | 0.006 | 0.025 | 0.018 | <0.02 | 1.16 | 1.1 |

A summary of the major changes in critical parameters from tests of treated carbons with crude hydrogen peroxide are shown in the following Table 3.

TABLE 3

| Item | Untreated, Activated Carbon | $(NH_4)_2EDTA$ 0.5% | $(NH_4)_2EDTA$ 1.0% | $(NH_4)_2CO_3$ 0.5% | $(NH_4)_2CO_3$ 1.0% |
|---|---|---|---|---|---|
| Decomposition - % | 1.1 | 1.3 | 2.0 | 4.4 | 4.0 |
| Chloride - ppm chg. | +0.16 | +0.08 | +0.07 | +0.1 | +0.11 |
| Phosphate - ppm chg. | +0.02 | +0.02 | −0.10 | −0.07 | −0.07 |
| Ammonium - ppm chg. | −4.31 | −1.59 | −2.43 | −4.54 | −3.50 |
| Free Acid - ppm chg | −29 | −45 | −45 | −40 | −40 |
| TRACE METAL CHANGES in ppb | | | | | |
| Aluminum | −246 | −309 | −307 | −306 | −308 |
| Boron | −12 | −21 | +17 | −14 | −7 |
| Calcium | +767 | +104 | +22 | +272 | +139 |
| Iron | −107 | −139 | −130 | −121 | −160 |
| Potassium | −295 | −182 | −194 | −156 | +241 |
| Magnesium | −13 | −48 | −36 | +7 | −27 |
| Sodium | +71 | +136 | +94 | +117 | +89 |
| Phosphorus | −50 | −290 | −250 | −230 | −350 |
| Silicon | −25 | −38 | +20 | +32 | +1 |
| Tin | +47 | +3 | 0 | +2 | +11 |
| Zinc | +39 | +180 | +186 | +43 | +167 |

While this invention has been described as having a preferred design, it is understood that it is capable of further modifications, uses and/or adaptations of the invention and following in general the principles of the invention and including such departures from the present disclosure as come within known or customary practive in the art to which the present invention pertains, and as may be applied to central features hereinbefore set forth, and fall within the scope of the invention or the limits of the claims appended hereto.

What is claimed is:

1. A process for the purification of hydrogen peroxide which includes the removal of impurities, comprising the steps of:
   (a) pretreating activated carbon by at least one hot washing of the same with ammonium carbonate;
   (b) contacting a quantity of hydrogen peroxide to be purified with the resultant washed activated carbon thereby effecting the absorbing of impurities present in the hydrogen peroxide; and
   (c) separating the contacted hydrogen peroxide and distilling the same.

2. The process as defined in claim 1, wherein:
   (a) the step of washing said activated carbon includes the slurring of the same in deionized water to make approximately a 10% slurry.

3. The process as defined in claim 1, wherein:
   (a) the step of pretreating said activated carbon includes a plurality of hot washes with ammonium carbonate.

4. The process as defined in claim 2, wherein:
   (a) the ammonium carbonate was added to said slurry to make about 0.5 to about 3.0 wt % treatment with respect to the carbon.

5. The process as defined in claim 2, including the step of:
   (a) stirring the slurry of ammonium carbonate and carbon at ambient temperature for approximately 30 minutes.

6. The process as defined in claim 5, including the step of:
   (a) filtering and drying the slurry at a temperature of about 115° C. for at least about five hours.

7. A process for the purification of hydrogen peroxide which includes the removal of impurities, comprising the steps of:
   (a) pretreating activated carbon by at least one hot washing of the same with ethylenediaminetetraacetic acid diammonium salt;
   (b) contacting a quantity of hydrogen peroxide to be purified with the resultant washed carbon thereby effecting the absorbing of impurities in the hydrogen peroxide; and
   (c) separating the contacted hydrogen peroxide and distilling the same.

8. The process as defined in claim 7, wherein:
   (a) the step of washing said activated carbon includes the slurring of the same in deionized water to make approximately a 10% slurry.

9. The process as defined in claim 7, wherein:
   (a) the step of pretreating said activated carbon includes a plurality of hot washes with ethylenediaminetetraacetic acid diammonium salt.

10. The process as in claim 8, wherein:
    (a) the ethylenediaminetetraacetic acid diammonium salt was added to said slurry to make about 0.5 to about 3.0 wt % treatment with respect to the carbon.

11. The process as defined in claim 8, including the step of:
    (a) stirring the slurry of ethylenediaminetetraacetic acid diammonium salt and carbon for approximately 30 minutes.

12. The process as defined in claim 11, including the step of:
    (a) filtering and drying the slurry at a temperature of about 115° C. for at least about five hours.

* * * * *